(12) United States Patent
Sanz-Pastor et al.

(10) Patent No.: US 6,268,861 B1
(45) Date of Patent: Jul. 31, 2001

(54) VOLUMETRIC THREE-DIMENSIONAL FOG RENDERING TECHNIQUE

(75) Inventors: Nacho Sanz-Pastor; Luis A. Barcena, both of Sunnyvale, CA (US)

(73) Assignee: Silicon Graphics, Incorporated, Mountain View, CA (US)

( * ) Notice: Subject to any disclaimer, the term of this patent is extended or adjusted under 35 U.S.C. 154(b) by 0 days.

(21) Appl. No.: 09/139,961

(22) Filed: Aug. 25, 1998

(51) Int. Cl.[7] .................................................. G06T 15/00
(52) U.S. Cl. ............................................. 345/426; 345/430
(58) Field of Search ..................................... 345/430, 425, 345/426, 431, 432, 424

(56) References Cited

U.S. PATENT DOCUMENTS

| | | | | |
|---|---|---|---|---|
| 6,002,406 | * | 12/1999 | Zhao ..................................... | 345/429 |
| 6,016,150 | * | 1/2000 | Lengyel et al. ....................... | 345/426 |
| 6,016,151 | * | 1/2000 | Lin ........................................ | 345/430 |
| 6,034,691 | * | 3/2000 | Aono et al. ........................... | 345/425 |
| 6,037,948 | * | 3/2000 | Liepa .................................... | 345/430 |
| 6,046,747 | * | 4/2000 | Saunders et al. .................... | 345/430 |
| 6,057,849 | * | 5/2000 | Haubner et al. ..................... | 345/428 |

OTHER PUBLICATIONS

Volume Rendering in Radiation Treatment Planning by Levoy et al., 1990.*

* cited by examiner

*Primary Examiner*—Mark Zimmerman
*Assistant Examiner*—Enrique L Santiago
(74) *Attorney, Agent, or Firm*—Squire, Sanders & Dempsey L.L.P.

(57) ABSTRACT

A method and apparatus for volumetric three-dimensional fog rendering is provided. To add fog effects to an image, a host processor computes the location of the eye-point relative to the image to be fogged. Using the eye-point location, the host processor generates a three-dimensional fog texture and a blending function. The three-dimensional fog texture and blending function are downloaded or otherwise passed by the host processor to the graphics processor. The graphics processor then renders the primitives that make up the image. When rendering is complete, the graphics processor applies the tree-dimensional fog texture in an additional rendering pass. The method may then be repeated, to create animated fog effects such as swirling or wind-driven fog.

18 Claims, 3 Drawing Sheets

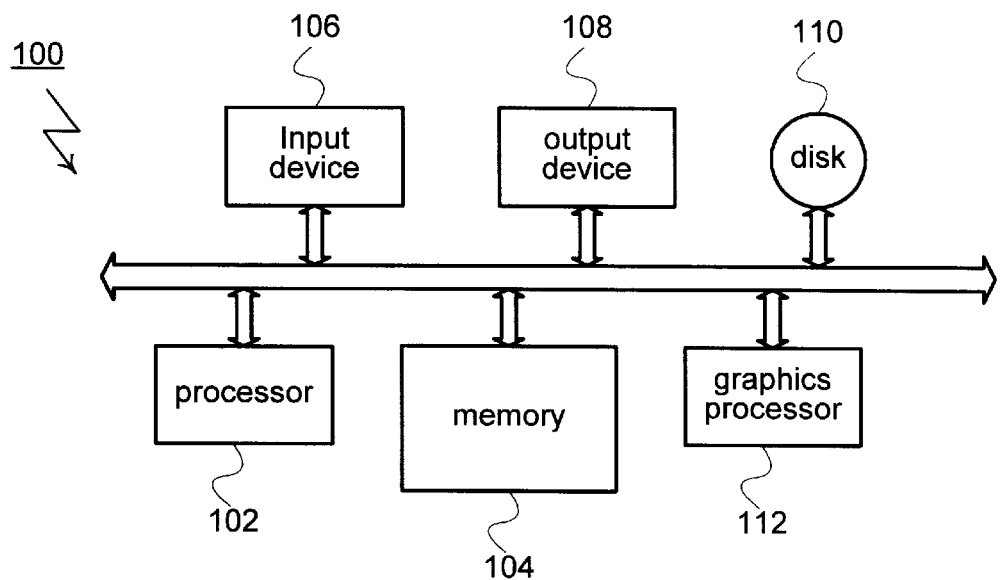
Fig. 1
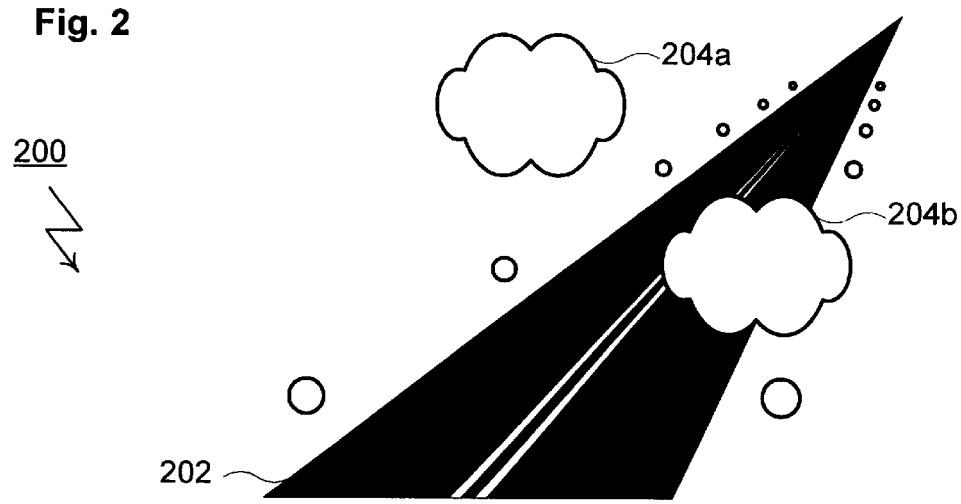
Fig. 2

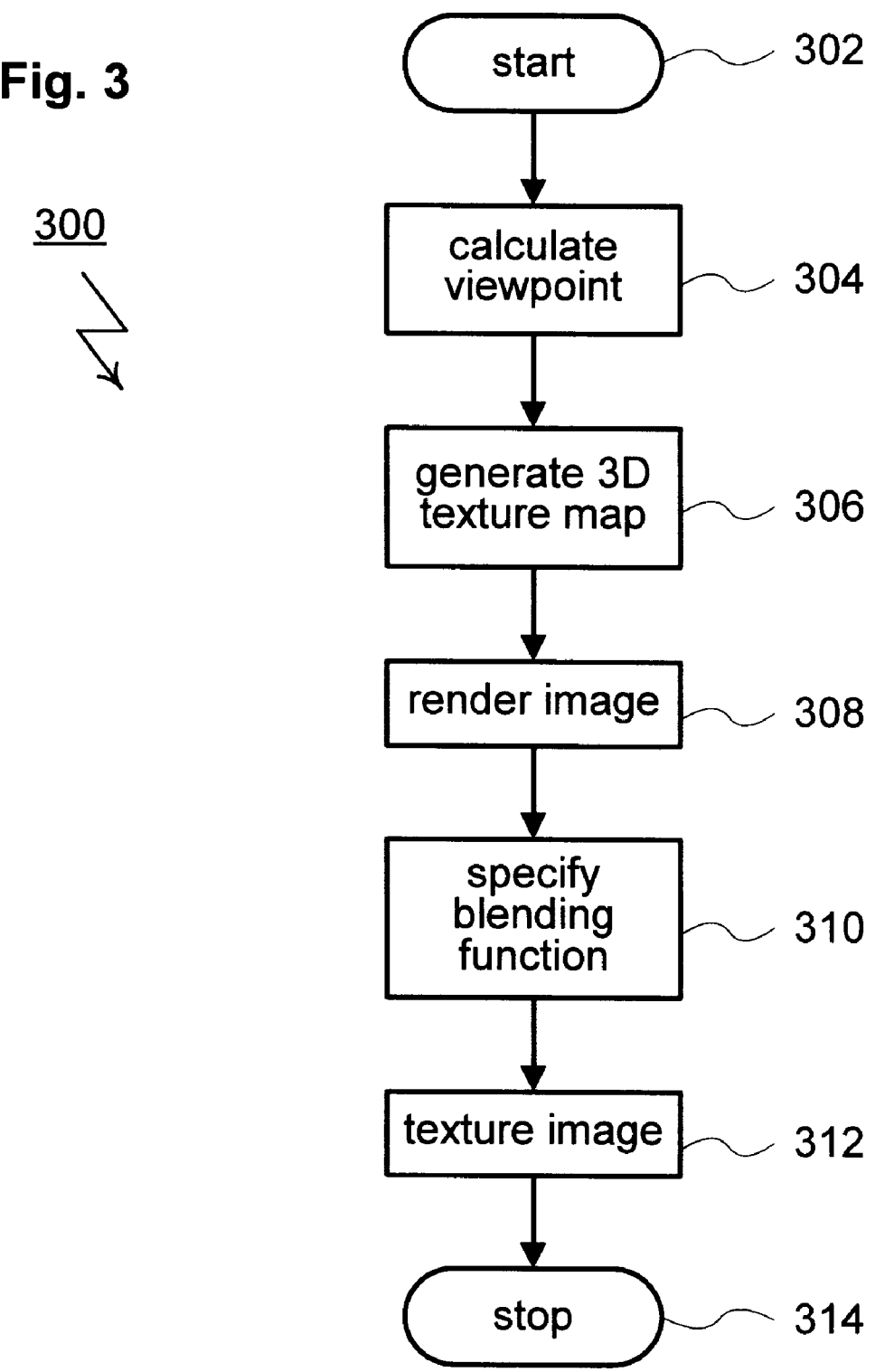

Fig. 4a
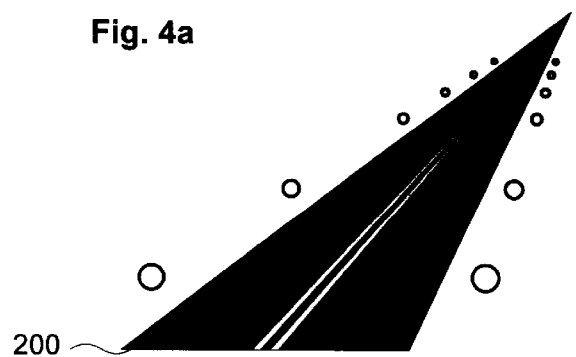
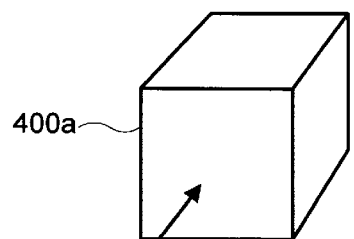
Fig. 4b
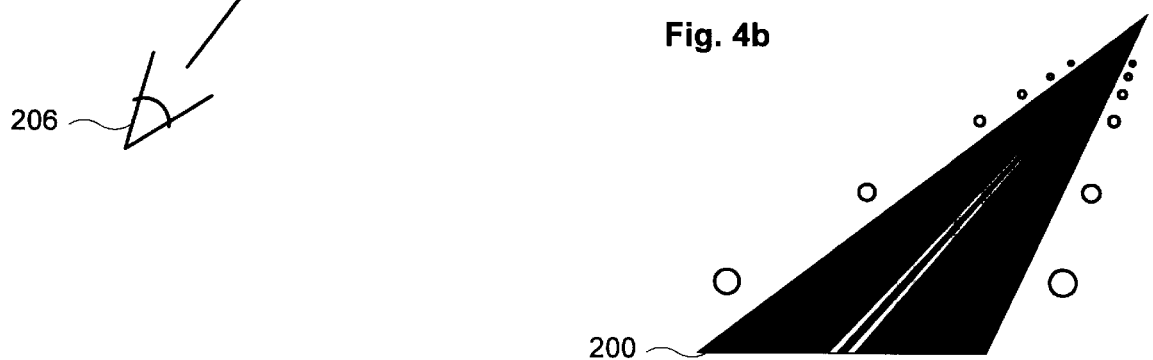
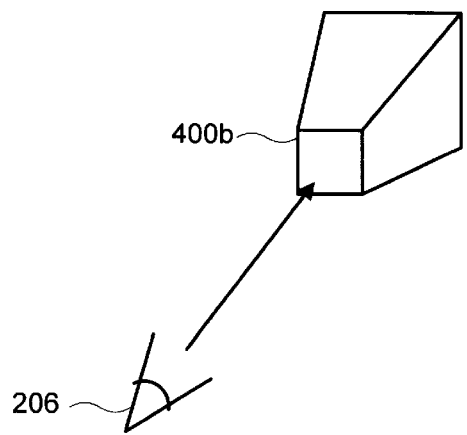

VOLUMETRIC THREE-DIMENSIONAL FOG RENDERING TECHNIQUE

FIELD OF THE INVENTION

The present invention relates generally to systems for computer graphics. More specifically, the present invention includes a method and apparatus for rendering three-dimensional fog effects in simulation environments, such as flight simulators.

BACKGROUND OF THE INVENTION

Fog effects are an important part of realistic simulation environments. As an example, flight simulators often use fog effects to simulate adverse weather conditions. This allows air crews to be safely familiarized with difficult operational scenarios, such as landing on fog-obscured runways. To be realistic, fog effects must closely model the appearance and behavior of real fog conditions. This means that fog effects must be capable of modeling patchy or otherwise non-uniform fog or haze. Realistic fog effects must also be capable of animation. This allows fog to swirl or move in a manner that mimics natural fog.

Computer systems (and related devices) typically create three-dimensional images using a sequence of stages known as a graphics pipeline. During early pipeline stages, images are modeled using a mosaic-like approach where each image is composed of a collection of individual points, lines and polygons. These points, lines and polygons are know as primitives and a single image may require thousands, or even millions, of primitives.

In the past, several techniques have been developed which can be used within the stages of a graphics pipeline to create fog effects. These techniques include color blending, texture mapping and volumetric rendering.

For color blending, a fog color is selected or defined. During the fogging process, the graphics pipeline blends the fog color into each of the pixels within the image being fogged. The graphics pipeline determines the amount of fog color to add to the image's pixels by calculating a weighting factor for each pixel. Each pixel's weighting factor is a linear or exponential function of the distance between the pixel and the eye-point. The graphics pipeline blends the predefined fog color into the each pixel in accordance with the pixel's weighting factor.

For texture mapping, a series of texture maps are generated. Each texture map is configured to make objects appear as if they are being viewed through a specific fog depth. Thus, a first texture map might make objects appear as if they were obscured by one meter of fog and a second texture map might make objects appear as if they were obscured by ten meters of fog. In some cases, the series of textures are encoded within a three-dimensional texture map. During the fogging process, the graphics pipeline selects the appropriate texture map for each primitive within the image being fogged. The selection of texture maps is based on the distance between the primitives and the eye-point. The pipeline then textures each primitive with the appropriate texture map.

For volumetric rendering, a three-dimensional volume is generated to model the desired fog effect. During the fogging process, the graphics pipeline applies the three-dimensional volume to the space between the primitives included in an image and the eye-point. Typically, this is accomplished through the use of a volumetric rendering technique such as ray-casting, voxel rendering, or three-dimensional texture-slice composition.

Color blending, texture mapping and volumetric rendering are all effective techniques for rendering uniform fog effects. Unfortunately, each of these techniques are subject to disadvantages that make them less than optimal for flight simulators and other simulation environments. For example, when color blending is used to create fog effects, the amount of fog color is controlled strictly by pixel distance. The means that fog effects produced by these techniques tend to be uniform (non-patchy) and constant over time (inanimate). Texture mapping and volumetric rendering each allow for the creation of non-uniform (patchy) fog effects. For this reason both of these techniques offer a higher degree of realism than is possible for color blending. Unfortunately, neither texture mapping nor volumetric rendering provide animated fog effects. Both of these techniques are also limited in other fashions. Texture mapping, for example, fails to provide a mechanism that allows the appearance of a fog effect to change as the eye-point moves in relation to an image. Volumetric rendering overcomes this difficulty but generally requires expensive hardware support within the graphics processor.

Thus, a need exists for a method for rendering fog effects that provides non-uniform, animated fog effects. The fog effects created must be accurately portrayed as the position of the eye-point changes within an image. These methods need to provide high-performance graphics throughput and be relatively inexpensive to implement. This need is especially important for simulation environments, such as flight simulators and for highly realistic virtual reality systems.

SUMMARY OF THE INVENTION

An embodiment of the present invention includes a method and apparatus for rendering fog effects. A representative environment for the present invention includes a computer system having at least one host processor and a graphics processor. The computer system includes a graphics pipeline. Initial pipeline stages within the graphics pipeline are performed by the host processor. Later pipeline stages are performed by the graphics processor.

For the purposes of the invention, it is assumed that each image to be rendered includes a volumetric fog definition. The volumetric fog definition defines the density of fog at all locations within the image. It is also assumed that the volumetric fog definition may change between frames. This corresponds to wind-blown, swirling or other animated fog effects.

To add fog effects to an image, the host processor calculates the position of the eye-point relative to the image to be drawn. Using the calculated position, the host processor generates a three-dimensional fog texture using the volumetric fog definition. The host processor performs this generation by volumetric rendering of the volumetric fog definition. The three-dimensional fog texture is then downloaded by the host processor to the graphics pipeline. Alternately, in cases where the host and graphics processors share a common memory, the stage of downloading may be eliminated.

With the three-dimensional texture in place, the graphics processor renders the primitives that make up the image. Typically, the rendering process will be accomplishing using one or more rendering passes through one or more stages within the graphics pipeline. As some time before or subsequent to the completion of the rendering process, the host processor supplies a blending function to the graphics processor. The blending function defines how the three dimensional texture will be applied to the image.

Once the host processor has supplied the blending function and the graphics processor has completed rendering the image, the graphics processor performs an additional texturing pass. The texturing pass applies the three-dimensional texture to the primitive that are included in the image being rendered.

The entire sequence of steps is then repeated, preferably on a frame-by-frame basis. Repetition ensures that the fog effect is accurately portrayed as the position of the eye-point changes relative to the image being rendered. Repetition also provides animated fog effects in cases where the volumetric fog definition of an image changes between frames. This allows the present invention to simulate swirling, wind-driven or other animated fog effects.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 1 is a block diagram of a host computer system shown as an exemplary environment for an embodiment of the present invention.

FIG. 2 is a block diagram of an image as rendered by an embodiment of the present invention.

FIG. 3 is a flowchart showing the steps associated with an embodiment of the three-dimensional fog rendering method of the present invention.

FIG. 4A is a block diagram of a cube shaped volume as used by an embodiment of the present invention.

FIG. 4B is a block diagram of a truncated pyramid shaped volume as used by an embodiment of the present invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

In FIG. 1, a computer system 100 is shown as a representative environment for the present invention. Structurally, computer system 100 includes a host processor, or host processors 102, and a memory 104. An input device 106 and an output device 108 are connected to host processor 102 and memory 104. Input device 106 and output device 108 represent a wide range of varying I/O devices such as disk drives, keyboards, modems, network adapters, printers and displays. Each computer system 100 may also include a disk drive 110 of any suitable disk drive type (equivalently, disk drive 110 may be any non-volatile mass storage system such as "flash" memory). Computer system 100 also preferably includes a graphics processor 112 of any suitable type. Graphics processor 112 implements all of the tasks required to translate graphics primitives and attributes to displayable output. In FIG. 1, host processor 102 and graphics processor 112 are interconnected using a bus. It should be appreciated that the present invention is equally suitable to environments where host processor 102 and graphics processor 112 share a commonly addressable memory.

VOLUMETRIC THREE-DIMENSIONAL FOG RENDERING TECHNIQUE

An embodiment of the present invention includes a method and apparatus for volumetric three-dimensional fog rendering. The method and apparatus of the present invention are better understood by reference to representative image 200 of FIG. 2. Image 200 depicts a runway 202 partially obscured by clouds 204a and 204b. Image 200 is shown with an eye-point 206. Eye-point 206 represents the position at which image 200 is viewed. Eye-point 206 is intended to be movable within image 200. This means that components of image 200, including runway 202 and clouds 204 may be viewed from a range of positions. The method and apparatus of the present invention allow non-uniform fog effects, such as clouds 204 to be realistically rendered as eye-point 206 moves within image 200. The method and apparatus of the present invention also allow clouds 204 to move in an animated fashion between subsequent renderings of image 200.

Image 200 is defined within computer system 100 as a series of graphics primitives and graphics attributes. As part of this definition, computer system 100 stores a volumetric fog definition of the fog effects that are present in image 200. The volumetric fog definition records the fog density for each point within image 200. For the specific example of FIG. 2, the volumetric fog definition would include definitions of clouds 204. For other images, more complex effects may be used. The volumetric fog definition is assumed to be changeable between renderings of image 200. This corresponds to moving, wind-blown or other animated fog effects.

In FIG. 3, an embodiment of the method for volumetric three-dimensional fog rendering is shown and generally designated 302. Method 302 begins symbolically with placeholder 302. In step 304, host processor 102 computes the position of eye-point 206 within image 200. In step 306, host processor 102 uses the computed eye-position 206 to generate a three dimensional fog texture.

Host processor 102 computes the three dimensional fog texture by performing a volumetric rendering of the volumetric fog definition that is included within the internal representation of image 200. Host processor 102 performs the volumetric rendering use any suitable technique such as ray-casting, voxel rendering, or three-dimensional texture-slice composition.

During the volumetric rendering of step 306, host processor 102 must analyze some portion of the volumetric fog definition of image 200. As shown in FIG. 4A, the portion analyzed in step 306 may be shaped as a cubic or other parallelepiped volume. Alternatively, as shown in FIG. 4B, the portion analyzed in step 306 may be shaped as a truncated pyramid shaped volume. In the case where a truncated pyramid is used, the pyramid is oriented so that its peak is pointed directly at eye-point 206. Use of a truncated pyramid reduces the amount of the volumetric fog definition that must be analyzed by host processor 102.

The resulting three-dimensional texture is cubic or rectangular in shape. For the purposes of the present invention, it is possible to use a relative small three-dimensional texture. In practice, sixteen by sixteen by eight (16×16×8) textures have been found to be suitable. Each point within the generated three-dimensional texture records the accumulated fog density between the eye-point and the corresponding location in image 200. In general, it is preferable to perform the volumetric rendering process on host processor 102. This provides a degree of overlap and parallelization between host processor 102 and graphics processor 112. In cases where graphics processor 112 includes support for volumetric rendering, it may be preferable to perform this task within graphics processor 112.

After generating the three-dimensional fog texture, host processor 102 takes whatever steps are required to make the generated texture available to graphics processor 112. In general, it should be appreciated that type of steps required to make the generated texture available are highly dependent on the architecture of computer system 100. In typical cases, host processor 102 will be required to download the generated texture to a memory within graphics processor 112. In cases where host processor 102 and graphics processor 112 share a common addressable memory, the downloading process may be eliminated.

In step 308, graphics processor 112 renders the graphics primitives included within image 200. The steps performed by graphics processor 112 to render image 200 depend both on the architecture of graphics processor 112 and on the content of image 200. Typically, for advanced systems, a multi-pass rendering process will be used by graphics processor 112 in step 308.

In step 310, host processor 102 specifies a blending function for the three-dimensional texture generated in step 306. The blending function controls how the three-dimensional texture will be applied to image 200. In FIG. 3, step 310 is shown to follow the rendering process of step 308. It should be appreciated, however, that the act of specifying the blending function may be performed either before, after or concurrently with step 308. Host processor 102 downloads or otherwise transmits the blending function to graphics processor 112.

In step 312, graphics processor 112 performs an additional rendering pass to apply the three-dimensional texture to image 200. Graphics processor 112 applies the three-dimensional texture to the primitive included in image 200 using the blending function supplied by host processor 102.

Method 300 is repeated by computer system 100 as new frames of image 200 are generated. Preferably, method 300 is repeated every frame or every few frames. This ensures that the fog effects being added to image 200 are accurately depicted as the position of eye-point 206 changes. Repetition also provides animated fog effects in cases where the volumetric fog definition of image 200 changes between frames. This allows the present invention to simulate swirling, wind-driven or other animated fog effects.

The preceding discussion is directed at the production of atmospheric fog effects. It is easily appreciated however, that the same rendering technique may be used to produce fog or haze effects in other environments. Thus, the present invention is specifically applicable to underwater haze effects as well as more diverse environments, such as microscopic environments and outerspace.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for applying fog to an image, comprising:
   (a) calculating, by a host processor, a location of an eye-point relative to the image;
   (b) based on the location of the eye-point, generating, by the host processor, a three-dimensional fog texture having a shape of a portion of a volumetric fog definition of the image by volumetric rendering of the volumetric fog definition;
   (c) rendering, by a graphics processor, the image;
   (d) defining, by the host processor, a blending function for the three-dimensional fog texture; and
   (e) applying, by the graphics processor, the three-dimensional fog texture to the image by use of the blending function.

2. A method as recited in claim 1, further comprising downloading, by the host processor, the three-dimensional fog texture to the graphics processor.

3. A method as recited in claim 1, further comprising repeating steps (a) through (e) to provide an animated fog effect.

4. A method as recited in claim 1, further comprising repeating steps (a) through (e) to account for changes in the location of the eye-point.

5. A method as recited in claim 1, wherein the portion of the volumetric fog definition has a cubic shape.

6. A method as recited in claim 5, further comprising changing, by the host processor, the volumetric fog definition to produce animated fog effects.

7. A method as recited in claim 1, wherein the portion of the volumetric fog definition has a truncated pyramid shape.

8. A computer program product comprising:
   a computer usable medium having computer readable code embodied therein for adding fog to an image, the computer program product comprising:
      first computer readable program code devices configured to cause a host processor to calculate a location of an eye-point relative to the image;
      second computer readable program code devices configured to cause the host processor to, based on the location of the eye-point, generate a three-dimensional fog texture having a shape of a portion of a volumetric fog definition of the image by volumetric rendering of the volumetric fog definition;
      third computer readable program code devices configured to cause a graphics processor to render the image;
      fourth computer readable program code devices configured to cause the host processor to define a blending function; and
      fifth computer readable program code devices configured to cause the graphics processor to apply the three-dimensional fog texture to the image using the blending function.

9. A computer program product as recited in claim 8 further comprising sixth computer readable program code devices configured to cause the host processor to download the three-dimensional fog texture to the graphics processor.

10. A computer program product as recited in claim 8 wherein the first through fifth computer readable program code devices are configured to operated on a frame-by-frame basis.

11. A computer program product as recited in claim 8 wherein the second computer readable program code devices are configured to cause the host processor to generate the three-dimensional fog texture by volumetric rendering of a volumetric fog definition of the image.

12. A computer program product as recited in claim 11 further comprising seventh computer readable program code devices configured to cause the host processor to change the volumetric fog definition to produce animated fog effects.

13. An apparatus for adding fog to an image, comprising:

a first portion configured to calculate a location of an eye-point relative to the image;

a second portion configured to generate, based on the location of the eye-point, a three-dimensional fog texture having a shape of a portion of a volumetric fog definition of the image by volumetric rendering of the fog definition;

a third portion configured to render the image;

a fourth portion configured to define a blending function; and a fifth portion configured to apply the three-dimensional fog texture to the image using the blending function.

14. An apparatus as recited in claim 13 further comprising a sixth portion configured to download the three-dimensional fog texture to the graphics processor.

15. An apparatus as recited in claim 13 wherein the first through fifth portions are configured to operated on a frame-by-frame basis.

16. An apparatus as recited in claim 13 wherein the portion of the volumetric fog has a cubic shape.

17. An apparatus as recited in claim 16 further comprising a portion configured to change the volumetric fog definition to produce animated fog effects.

18. An apparatus as recited in claim 13, wherein the portion of the volumetric fog definition has a truncated pyramid shape.

* * * * *